Oct. 23, 1934.  S. H. DOWNS  1,978,127
INLET DAMPER
Filed March 14, 1932

INVENTOR
Sewell H. Downs
BY
Chappell & Earl
ATTORNEYS.

Patented Oct. 23, 1934

1,978,127

UNITED STATES PATENT OFFICE 1,978,127

INLET DAMPER

Sewell H. Downs, Kalamazoo, Mich., assignor to Clarage Fan Company, Kalamazoo, Mich.

Application March 14, 1932, Serial No. 598,783

5 Claims. (Cl. 230—114)

The main objects of the invention are:

First, to provide a unitary damper and inlet cone construction for fans.

Second, to provide a suitable and simple control therefor that is integral with the damper and inlet cone.

Further objects and advantages of the invention will appear from a consideration of the description to follow and the drawing, in which.

Figure 1:
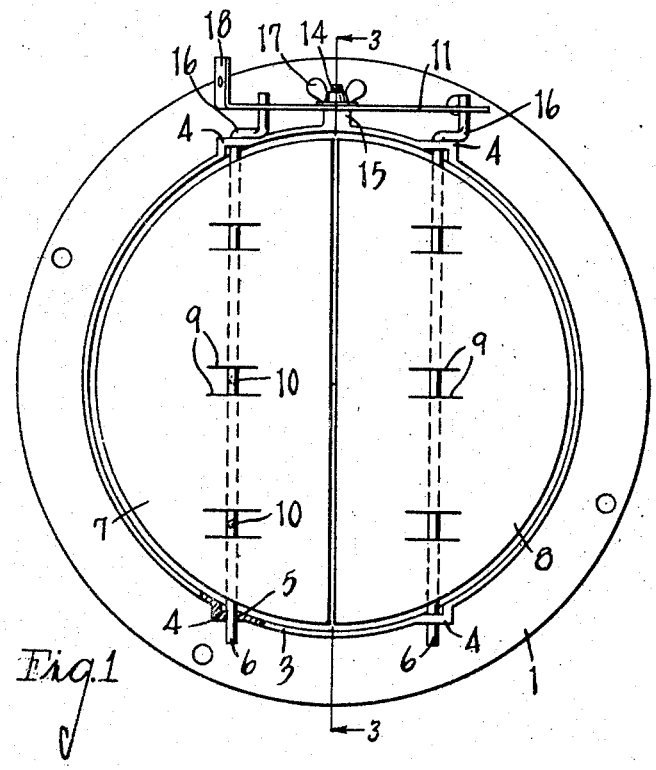
Fig. 1 is an elevation view of the device showing the damper in closed position.
Figure 3:
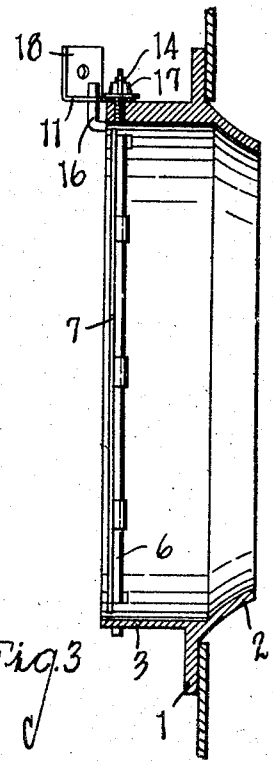
Fig. 3 is a section on line 3—3 of Fig. 1.
Figure 2:
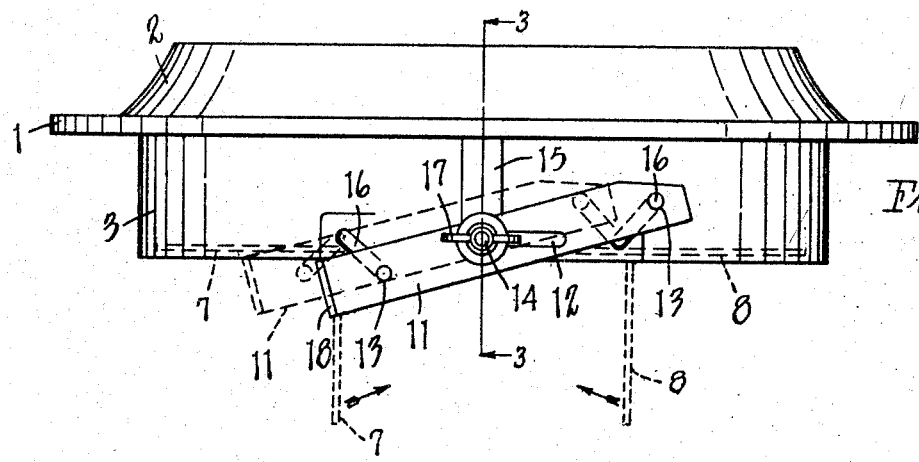
Fig. 2 is a plan view showing the control means.

The parts will be identified by their numerals of reference, which are the same in all views.

1 represents an inlet cone for a conventional fan having thereon a flange 2 adapted to direct the flow of air to the center of the fan wheel. 3 represents an external flange adapted to support the dampers and the control means therefor. On flange 3 are spaced bosses or struck up portions 4 having therein holes 5 in which are rotatably journaled crank rods 6 having crank arms 16 adapted to bear on said bosses for rotation.

7 and 8 represent semi-circular blades or damper vanes adapted to completely shut off the flow of air through the inlet cone 1. The blades here shown are semi-circular in form but any shape of blade that will close the inlet may be used, provided it can be rotated for opening of the damper.

The blades 7 and 8 are mounted on crank rods 6 which are inserted in slots 9 in the blades and are spotwelded as at 10. Although this method of mounting the blades has been found most satisfactory, it is obvious to one skilled in the art that any equivalent means could be used.

Means for controlling and setting the blades comprise a control bar 11 having a diagonal slot 12 therein and spaced holes 13 so positioned that they engage the cranks when both blades 7 and 8 are in closed position. A bolt 14 adapted to engage slot 12 is provided in a boss 15 on flange 3, which bolt has a thumb nut 17 adapted to clamp the control bar 11 in any desired position. It is possible to substitute any sort of support or bracket for the boss 17 to provide holding and clamping means for the bar 11. The bar 11 is provided with a handle or bracket 18 for use in moving the bar or for connection to some actuating means.

In operation the thumb nut 16 is loosened to allow movement of the control bar 11. Movement of the bar causes simultaneous rotation of both blades, and when the blades are at the desired position thumb nut 17 may be tightened and the blades will be held in such position.

This construction has proven especially advantageous because of the simplicity of construction which lends manufacturing advantages. The unitary nature of the structure makes it possible to save by omission of unnecessary parts, as the inlet cone of the fan serves both as a cone and as a support for the damper. The bosses 4 and 15 being integral with the flange 3 can be produced in one operation if the cone is cast or struck up from the flange 3 if the cone is not cast. They form not only journals for rods 6 but supporting bearings for the damper, and make for an extremely simple construction.

The unitary nature of the invention makes it possible to turn out units for installation with no need for field work other than merely placing the device in the inlet opening of a fan.

Having thus described my invention what I claim as new and desire to secure by Letters Patent is:

1. An inlet cone for fans having integral therewith a substantially cylindrical external flange, crank rods journalled across said inlet cone in said flange, damper blades carried by said crank rods within said cone adapted to control the flow of air through said cone, spaced external bosses on said flange adapted to engage the crank arms of said rods as supporting bearings to support said rods and damper blades for rotation, and control means for said blades comprising a slotted control bar having spaced holes to engage the cranks of said crank rods, an external boss on said flange adapted to support said bar and having a bolt to engage the slot in said bar, and a nut to clamp said bar to said boss whereby the blades are retained in desired position.

2. An inlet cone for fans having integral therewith a substantially cylindrical external flange, damper blades journaled in said flange for rotation within said cone and having controlling cranks extending outside of said flange, external bosses on said flange adapted to engage the crank arms of said cranks as supporting bearings for said blades, and control means for said blades comprising a slotted control bar having spaced holes to engage the cranks of said crank rods, an external boss on said flange adapted to support said bar and having a bolt to engage the slot in said bar, and a nut to clamp said bar to said boss whereby the blades are retained in desired position.

3. An inlet cone for fans having a substantially cylindrical external flange, crank rods journaled across said inlet in said flange, damper blades carried by said crank rods for rotation on said cone and adapted to control the flow of air through said cone, spaced external bosses on said flange adapted to engage the crank arms of said rods as supporting bearings to support said rods and damper blades for rotation, and control means for said blades comprising a slotted control bar having spaced holes to engage the cranks of said crank rods, an external boss on said flange adapted to support said bar and having a bolt to engage the slot in said bar, and a nut to clamp said bar to said boss whereby the blades are retained in desired position.

4. An inlet cone for fans having a substantially cylindrical external flange, damper blades journaled in said flange for rotation within said cone and having controlling cranks extending outside of said flange, external bosses on said flange adapted to engage the crank arms of said cranks as supporting bearings for said blades, and control means for said blades comprising a slotted control bar having spaced holes to engage the cranks of said crank rods, an external boss on said flange adapted to support said bar and having a bolt to engage the slot in said bar, and a nut to clamp said bar to said boss whereby the blades are retained in desired position.

5. An inlet cone for fans having integral therewith a substantially cylindrical external flange, damper blades journaled in said flange for rotation therein and having controlling cranks extending outside of said flange, external bosses on said flange and integral therewith adapted to engage the crank arms of said cranks as supporting bearings for said blades, and control means for said blades comprising a slotted control bar having spaced holes to engage the cranks of said crank rods, an external boss on said flange and integral therewith adapted to support said bar and having a bolt to engage the slot in said bar, and a nut to clamp said bar to said boss whereby the blades are retained in desired position.

SEWELL H. DOWNS.